(12) United States Patent
Pan (10) Patent No.: US 7,940,652 B1
(45) Date of Patent: May 10, 2011

(54) PSEUDOWIRE PROTECTION USING A STANDBY PSEUDOWIRE

(75) Inventor: Ping Pan, San Jose, CA (US)

(73) Assignee: Brixham Solutions Ltd., Tortola (VG)

( * ) Notice: Subject to any disclaimer, the term of this patent is extended or adjusted under 35 U.S.C. 154(b) by 861 days.

(21) Appl. No.: 11/354,569

(22) Filed: Feb. 14, 2006

Related U.S. Application Data (60) Provisional application No. 60/653,065, filed on Feb. 14, 2005.

(51) Int. Cl.
*H04J 3/14* (2006.01)
(52) U.S. Cl. ......... 370/228; 370/216; 370/225; 709/220
(58) Field of Classification Search ............... 370/216, 370/225, 228; 709/220
See application file for complete search history.

(56) References Cited

U.S. PATENT DOCUMENTS

| | | | |
|---|---|---|---|
| 5,920,705 A | 7/1999 | Lyon et al. | |
| 6,167,051 A | 12/2000 | Nagami et al. | |
| 6,347,088 B1 | 2/2002 | Katou et al. | |
| 6,430,184 B1 | 8/2002 | Robins et al. | |
| 6,546,427 B1 | 4/2003 | Ehrlich | |
| 6,574,477 B1 * | 6/2003 | Rathunde ............... | 455/453 |
| 6,621,793 B2 | 9/2003 | Widegren et al. | |
| 6,665,273 B1 | 12/2003 | Goguen et al. | |
| 6,680,943 B1 | 1/2004 | Gibson et al. | |
| 6,751,684 B2 | 6/2004 | Owen et al. | |
| 6,813,271 B1 | 11/2004 | Cable | |
| 6,845,389 B1 | 1/2005 | Sen et al. | |
| 6,985,488 B2 | 1/2006 | Pan et al. | |
| 7,050,396 B1 | 5/2006 | Cohen et al. | |
| 7,200,104 B2 * | 4/2007 | Saleh et al. ............... | 370/216 |
| 7,436,782 B2 | 10/2008 | Ngo et al. | |
| 7,697,528 B2 | 4/2010 | Parry | |
| 2001/0021175 A1 | 9/2001 | Haverinen | |
| 2001/0023453 A1 | 9/2001 | Sundqvist | |
| 2002/0112072 A1 | 8/2002 | Jain | |
| 2002/0141393 A1 | 10/2002 | Eriksson | |
| 2002/0146026 A1 | 10/2002 | Unitt et al. | |
| 2003/0002482 A1 | 1/2003 | Kubler et al. | |
| 2003/0039237 A1 | 2/2003 | Forslow | |
| 2003/0117950 A1 * | 6/2003 | Huang ............... | 370/220 |
| 2004/0105459 A1 | 6/2004 | Mannam | |
| 2004/0114595 A1 | 6/2004 | Doukai | |
| 2004/0133692 A1 * | 7/2004 | Blanchet et al. ............... | 709/230 |
| 2004/0156313 A1 | 8/2004 | Hofmeister | |
| 2004/0174865 A1 | 9/2004 | O'Neill | |
| 2004/0252717 A1 | 12/2004 | Solomon et al. | |

(Continued)

OTHER PUBLICATIONS

Ziying Chen: "The LSP Protection/Restoration Mechanism in GMPLS" Internet Citatio (Online) Oct. 2002 (Oct. 1, 2002), XP002239552 Retrieved from the ineternet URL: http://www.site.uottawa.ca/~bochmann/dsrg/PublicDocuments/Master-theses/Chen,%20Ziying%20%20-%202002.pdf.*

(Continued)

*Primary Examiner* — William Trost, IV
*Assistant Examiner* — Siming Liu (57) ABSTRACT

Providing protection to network traffic includes sending a Pseudowire protection configuration parameter for configuring a standby Pseudowire between a source node and a destination node, receiving a Pseudowire configuration acknowledgement indicating whether the Pseudowire protection configuration parameter has been accepted by the destination node, and in the event that the Pseudowire protection configuration parameter has been accepted by the destination node, using the standby Pseudowire, wherein the standby Pseudowire is configured based at least in part on the Pseudowire protection configuration parameter.

17 Claims, 7 Drawing Sheets

U.S. PATENT DOCUMENTS

| | | | |
|---|---|---|---|
| 2005/0018605 A1 | 1/2005 | Foote | |
| 2005/0044262 A1 | 2/2005 | Luo | |
| 2005/0220148 A1 | 10/2005 | DelRegno | |
| 2005/0237927 A1 | 10/2005 | Kano et al. | |
| 2006/0002423 A1 | 1/2006 | Rembert | |
| 2006/0018252 A1* | 1/2006 | Sridhar et al. | 370/216 |
| 2006/0046658 A1* | 3/2006 | Cruz et al. | 455/67.11 |
| 2006/0047851 A1* | 3/2006 | Voit et al. | 709/239 |
| 2006/0090008 A1 | 4/2006 | Guichard | |
| 2006/0146832 A1 | 7/2006 | Rampal | |
| 2006/0233167 A1 | 10/2006 | McAllister | |
| 2007/0053366 A1 | 3/2007 | Booth, III | |
| 2007/0127479 A1 | 6/2007 | Sinicrope et al. | |
| 2007/0206607 A1 | 9/2007 | Chapman | |
| 2008/0031129 A1 | 2/2008 | Arseneault | |

OTHER PUBLICATIONS

Braden, R. et al., "Integrated Services in the Internet Architecture: an overview," Network Working Group, Jun. 1994.

Bryant, S. et al., "Pseudo Wire Emulation Edge-to-Edge (PWE3) Architecture," Network Working Group, Mar. 2005.

Blake, S. et al., "An Architecture for Differentiated Services," Network Working Group, Dec. 1998.

Shah, Himanshu et al., Internet Draft, ARP Mediation for IP Interworking of Layer 2 VPN, L2VPN Working Group, Jul. 2007.

Martini, Luca et al., Internet Draft, Segmented Pseudo Wire, Network Working Group, Jul. 2007.

Pan, P. et al., Internet Draft, Pseudo Wire Protection, Jul. 2006.

Rosen, Eric C. et al., Internet Draft, PWE3 Congestion Control Framework, Network Working Group, Mar. 2004.

Rosen, E. et al., BGO-MPLS IP Virtual Private Networks (VPN), Network Working Group, Feb. 2006.

Pan, Ping, Internet Draft, Dry-Martini: Supporting Pseudo-wires in Sub-IP Access Networks, Network Working Group, Jul. 2005.

Mcpherson et al., Pseudowire Emulation Edge to Edge (PWE3) Jun. 13, 2007, http://www.ietforg/html.charters/pwe3-carter.html.

Afferton, Thomas S. et al., Ethernet Transport over Wide Area Networks, Packet-Aware Transport for Metro Networks, IEEE Communications Magazine, pp. 120-127, Mar. 2004.

Martini, L. et al., Pseudowire Setup and Maintenance using the Label Distribution Protocol (LDP), Network Working Group, Apr. 2006.

Anderson, L. et al., LDP Specification, Network Working Group, Jan. 2001.

Martini, Luca et al., Encapsulation Methods for Transport of Ethernet over MPLS Networks, Network Working Group, Apr. 2006.

Martini, Luca et al., Encapsulation Methods for Transport of Frame Relay Over MPLS Networks, Network Working Group, Feb. 2006.

Metz, Chris et al., Pseudowire Attachment Identifiers for Aggregation and VPN Autodiscovery, PWE3 Working Group, Feb. 25, 2006.

Martini, Luca et al., Dynamic Placement of Multi Segment Pseudo Wires, PWE3 Working Group, Jun. 2006.

Martini, Luca et al., "Pseudowire Setup and Maintenance using LDP", Network Working Group, Mar. 2005.

Vasseur, et al., Path Computation Element (pce), May 9, 2007, http://www.ietforg/html.charters/pce.charter.html.

Theimer, T. et al, "Requirements for OAM Functionality in MPLS", Oct. 1999, Watersprings.

Harry Newton, "Newton's Telecom Dictionary", 23rd Updated and Expanded Edition, p. 825, p. 239, Flatiron Publishing, New York, Mar. 2007.

* cited by examiner

PSEUDOWIRE PROTECTION USING A STANDBY PSEUDOWIRE

CROSS REFERENCE TO OTHER APPLICATIONS

This application claims priority to U.S. Provisional Patent Application No. 60/653,065 entitled PSEUDO WIRE PROTECTION filed Feb. 14, 2005 which is incorporated herein by reference for all purposes.

BACKGROUND OF THE INVENTION

In recent years, many networking and telecommunications carriers have deployed Pseudowires to carry Layer-2 (also known as the data link layer of the Open Systems Interconnection (OSI) Reference Model) traffic. A Pseudowire (PW) refers to an emulation of a native service over a network. Examples of the native service include Asynchronous Transfer Mode (ATM), Frame Relay, Ethernet, Time Division Multiplexing (TDM), Synchronous Optical Network (SONET), Synchronous Digital Hierarchy (SDH), etc. Examples of the network include Multiprotocol Label Switching (MPLS), Internet Protocol (IP), etc. More recently, a number of carriers have extended the use of Pseudowires beyond packet encapsulation, and offered Pseudowires as a type of network service. Consequently, data traffic protection and redundancy in environments that use Pseudowire have become critical.

At the edge of a network, a network edge device such as an edge router may receive multiple Layer-2 flows (also referred to as Attachment Circuits (ACs)). In a typical network supporting Pseudowires, each AC is mapped to a Pseudowire. Ingress packets received mapped to a specific Pseudowire are labeled with an identifier associated with this Pseudowire, and are switched via the Pseudowire. A physical link may support one or more Pseudowires. Ideally, the data flow in a Pseudowire should be protected. In other words, if an active Pseudowire fails, the data flow should be redirected to an alternative Pseudowire to avoid data loss.

Pseudowires can operate over many physical media types. However, existing Pseudowire systems typically provide no protection or very limited protection. For example, there is usually no data protection for Pseudowires on different physical media types, since most network protection schemes, such as APS for SONET, Link Aggregation for Ethernet, do not apply over multiple physical media types.

Some MPLS devices implement schemes such as MPLS Fast Reroute to provide limited data protection. These existing schemes, however, often do not provide adequate protection. Take the following scenario as an example: between two provider edges (PEs), a first tunnel comprising multiple Pseudowires is protected by a second tunnel. Due to network topology constraints, the two tunnels may have different bandwidth. This is a possible scenario in an MPLS Fast Reroute operation. In this example, the second tunnel may have lower bandwidth than that of the first one. If the first tunnel should fail, the amount of data that needs to be redirected through the second tunnel may exceed the capacity of the second tunnel. Furthermore, existing protocols typically do not provide a way of determining which data gets priority. Thus, certain mission critical data may be dropped while other less critical data may pass through.

It would be desirable to have a way to provide better Pseudowire protection and to have more control during switchover. It would also be desirable if the protection scheme could be implemented without significant changes to existing protocols and devices.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing protection to network traffic using one or more Pseudowires is disclosed. In some embodiments, a Pseudowire protection configuration parameter is sent to a destination node. A Pseudowire configuration acknowledgment from the destination node is received. If a Pseudowire is allowed to be established according to the Pseudowire configuration acknowledgment, it is established based at least in part on the Pseudowire protection configuration parameter. In embodiments where the Pseudowire is established as a standby Pseudowire configured to protect one or more primary Pseudowires, in the event that a primary Pseudowire fails to transfer network traffic for reasons such as network congestion, equipment failure, etc., network traffic that is originally designated to be transferred on the primary Pseudowire(s) is switched from the primary Pseudowire(s) to the standby Pseudowire.

Figure 1A:
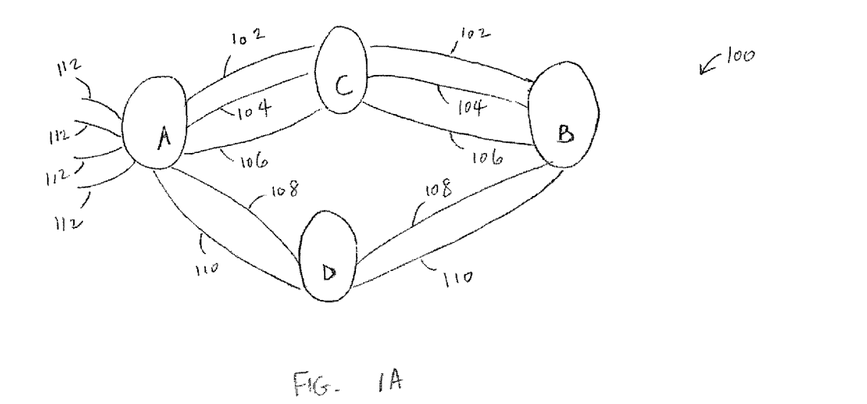
FIGS. 1A and 1B are block diagrams illustrating an embodiment of a single-hop Pseudowire system and an embodiment of a multi-hop Pseudowire system, respectively.
Figure 1B:
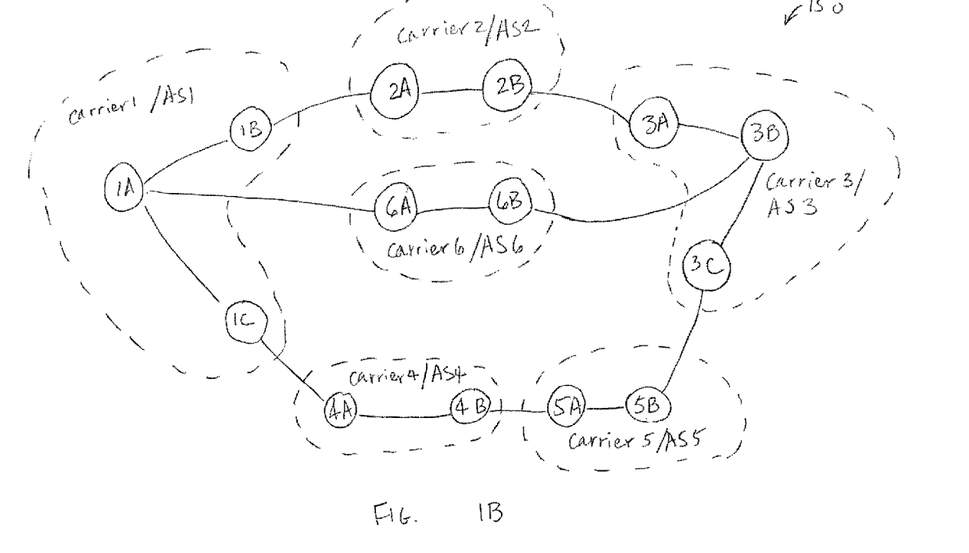

The protection technique is applicable to both single-hop and multi-hop systems. FIGS. 1A and 1B are block diagrams illustrating an embodiment of a single-hop Pseudowire system and an embodiment of a multi-hop Pseudowire system, respectively. Configuring and switching the Pseudowire will be discussed in more detail below.

In the example shown in FIG. 1A, system 100 is a single-hop system where the nodes in the system all belong to the same carrier network. Within each carrier network, all network nodes and facility are under a common administrative control. A service provider company may own multiple carrier networks in different regions. As used herein, a node refers to a networked device. In this case, the nodes in the system are provider edges (PEs) A, B, C, and D, which all belong to the same carrier network. Ingress data received by attachment circuits 112 of PE A designated for PE B may be sent via a label switched path (LSP) through PEs A, C, and B, or an LSP through PEs A, D, and B. The first LSP comprises Pseudowires 102, 104 and 106, and the second LSP comprises Pseudowires 108 and 110. In this example, the Pseudowire connections between PEs are established using the Label Distribution Protocol (LDP). The connections are based on LDP sessions. Each LDP session is to connect two local or remote nodes. There may be multiple paths interconnecting any two nodes in the network. Thus, for each LDP session, there may be multiple LDP Hello Adjacencies, one LDP Hello Adjacency per path. For purposes of example, throughout this specification, LDP is used as the communication protocol between nodes. Other appropriate protocols may also be used.

In the example shown in FIG. 1B, system 150 is a multi-hop system since it includes multiple carrier networks. Carrier networks 1-6 form autonomous systems 1-6, respectively. Each autonomous system includes one or more networks that are controlled by a carrier. For purposes of illustration, three Pseudowires are shown in this example to transfer data between PE 1A and PE 3B: a first Pseudowire comprising a path via autonomous systems 1, 2, and 3, a second Pseudowire comprising a path via autonomous systems 1, 6, and 3, and a third Pseudowire comprising a path via autonomous systems 1, 4, 5, and 3. Other Pseudowire formations are possible. At the source node PE 1A, data packets to be sent via a particular Pseudowire are labeled with an identifier associated with the Pseudowire, forwarded on to the next provider edge on one Pseudowire segment, and forwarded again if necessary until the packets reach the destination node 3B.

Figure 2:
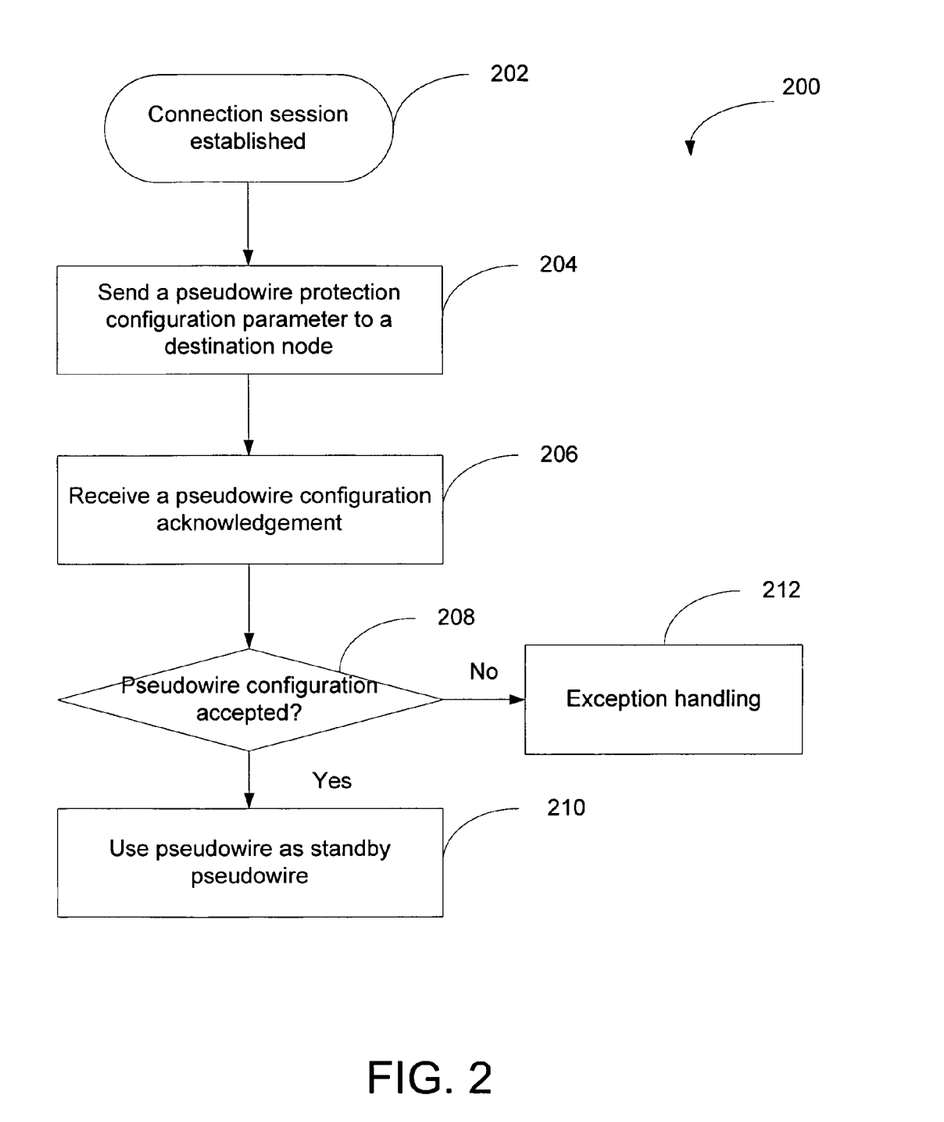
FIG. 2 is a flowchart illustrating an embodiment of a process of providing data protection using Pseudowires.

FIG. 2 is a flowchart illustrating an embodiment of a process of providing data protection using Pseudowires. Process 200 may be implemented on a source node such as A or 1 A of systems 100 and 150, or on an independent management agent that communicates with the source node. For purposes of illustration, the process is shown as implemented on a source node in the following example. The process initializes when a connection session is established between the source node and the destination node (202). A Pseudowire protection configuration parameter for configuring a Pseudowire based on the connection session is sent (204). The Pseudowire protection configuration parameter includes one or more fields that specify certain protection properties associated with the Pseudowire. It may be sent to the destination node or a management agent that communicates with the destination node. Details of the configuration parameter will be discussed further below.

Once the destination node (or its associated management agent) receives the Pseudowire protection configuration parameter, it determines whether it will accept the Pseudowire protection configuration and allow a standby Pseudowire to be established. Depending on implementation, the destination node determines whether to accept the protection configuration based on factors such as traffic condition, number of existing Pseudowires, priority information, etc. The destination node may reject the protection request for a number of reasons. For example, the destination node does not support Pseudowire protection mechanism as described here. If a standby Pseudowire may be established, the destination node accepts it and configures the Pseudowire based at least in part on the configuration parameters. In some embodiments, the destination node adds the Pseudowire to a table of Pseudowires. A corresponding Pseudowire configuration acknowledgment is generated, indicating whether the destination node has accepted the Pseudowire configuration. The Pseudowire configuration acknowledgment is sent to the source node. In some embodiments, as a part of the LDP process, a MPLS label for the data packets traversing through the standby Pseudowire is assigned.

At the source node, once the Pseudowire configuration acknowledgment is received (206), it is examined to determine whether the Pseudowire configuration has been accepted (208). If, according to the Pseudowire configuration acknowledgment, the Pseudowire configuration has been accepted by the destination, a standby Pseudowire is established based at least in part on the Pseudowire protection configuration parameter and may be used as such (210). If, however, the Pseudowire configuration has not been accepted, the process performs appropriate exception handling, such as re-sending the Pseudowire protection configuration parameter (212).

Figure 3A:
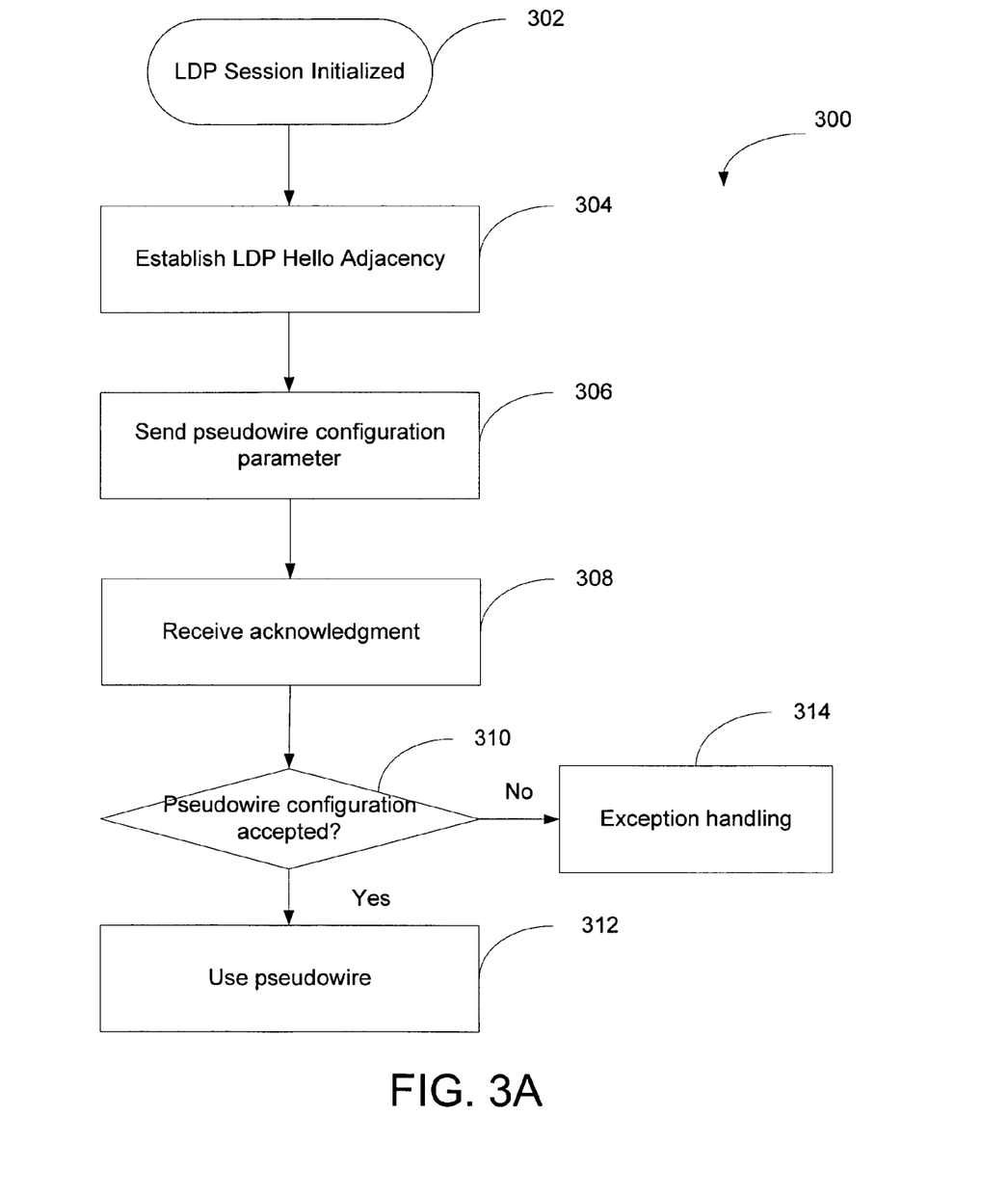
FIG. 3A is a flowchart illustrating another embodiment of a process of providing data protection using Pseudowires.

FIG. 3A is a flowchart illustrating another embodiment of a process of providing data protection using Pseudowires. Process 300 may be implemented on a PE, on an independent management agent, or the like. For purposes of illustration, in the following example, the process is initiated and carried out on a PE source node.

Process 300 begins with the initialization of an LDP session (302). According to the negotiation scheme based on LDP, the source node exchanges messages with the destination node and establishes an LDP Hello Adjacency (304). A Pseudowire setup request that includes a Pseudowire protection configuration parameter is sent to the destination node (or its associated management agent), requesting that a standby Pseudowire be established over the LDP Hello Adjacency (306). In some embodiments, multiple LDP Hello Adjacencies are available for Pseudowire setup, thus multiple setup requests are sent, and the destination node processes the requests and maps Pseudowires to appropriate LDP Hello Adjacencies. In some embodiments, the source node dynamically determines which LDP Hello Adjacency among the available connections is to be configured as a standby Pseudowire, and directs its setup request accordingly. The dynamic determination may be based on, among other things, bandwidth availability on the adjacency path.

In some embodiments, the request is sent as a LDP Label Mapping Message. The configuration parameter is used to configure various properties of the Pseudowire, including protection type, protection scheme, priority, etc. Further details of the configuration parameters are discussed below. In some embodiments, multiple LDP Hello Adjacencies are established and the source node sends multiple Pseudowire setup requests to configure Pseudowires over these LDP Hello Adjacencies.

In this example, upon receiving a Pseudowire setup request, the destination node maps the request to the appropriate LDP Hello Adjacency. If the mapping is successful, the Pseudowire is established. Sometimes, however, the mapping and consequently the Pseudowire setup may fail for reasons such as network congestion, resource limitation, equipment failure, etc. The destination node sends a Pseudowire configuration acknowledgment to the source node. In this example, the Pseudowire configuration acknowledgment is an LDP acknowledgement indicating whether a particular Pseudowire has been successfully established. Once the source node receives the acknowledgement (308), it determines whether the configuration has been accepted by the destination (310). If the configuration has been accepted, a standby Pseudowire is successfully established based at least in part on the Pseudowire protection configuration parameter, and the source and destination nodes can start using the standby Pseudowire to protect other Pseudowires (312). If, however, the acknowledgment indicates that the configuration has not been accepted and a Pseudowire has not been successfully established, appropriate exception handling measures such as resending the Pseudowire protection configuration parameter are taken (314).

Process 300 is applicable to both single-hop and multi-hop systems. In a single-hop system, the source node and the destination node correspond to a source PE and a destination PE on the network and the process is used to configure a standby Pseudowire between the PEs. In a multi-hop system, the process may be repeated by the PEs on various carrier networks to establish Pseudowire segments. For example, in system 150 of FIG. 1B, PE 1A can use process 300 to establish a Pseudowire segment with PE 6A, and PE 6A can use the same process to establish-a Pseudowire segment with PE 6B, which can use the same process to establish a Pseudowire segment with PE 3B.

Figure 3B:
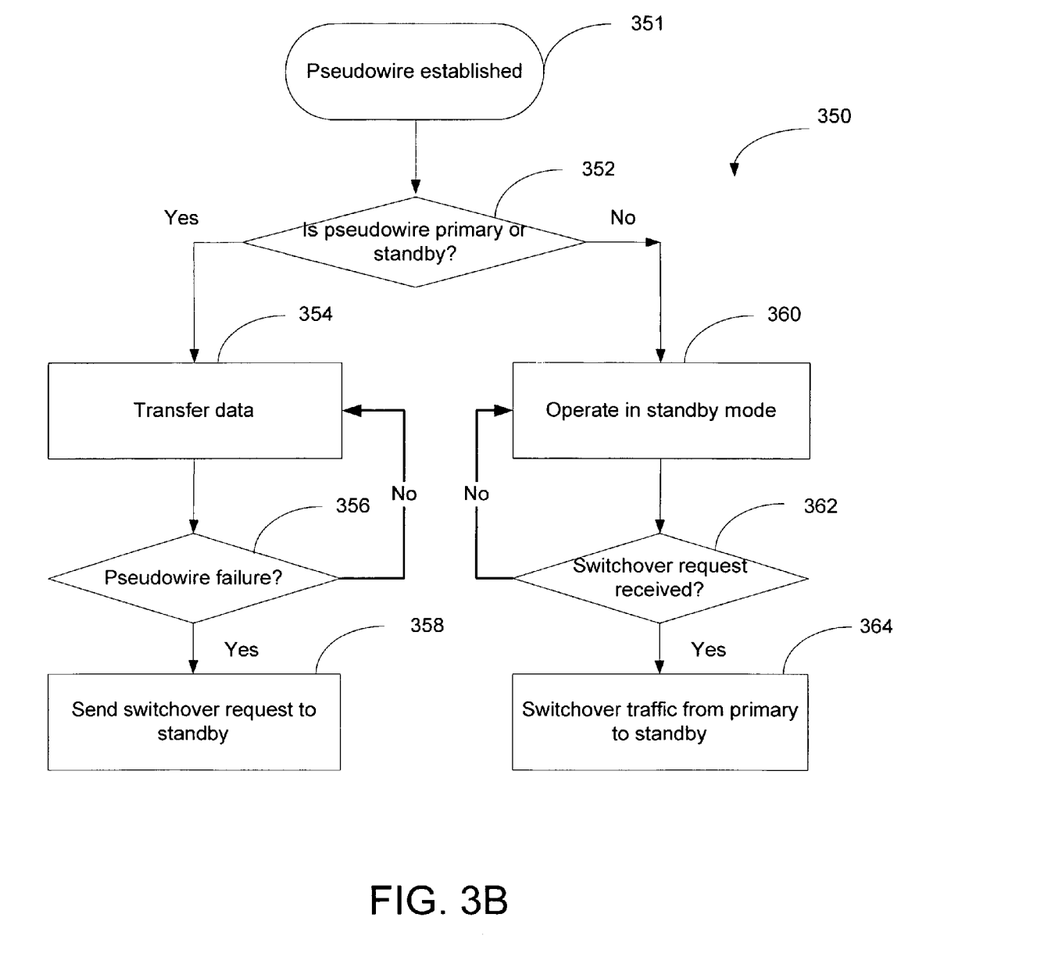
FIG. 3B is a flowchart illustrating how the Pseudowire is used, according to some embodiments.

FIG. 3B is a flowchart illustrating how the Pseudowire is used, according to some embodiments. Process 350 may be implemented on the source node, the destination node, or both. In this example, the designation of the Pseudowire is first determined (352). The designation may be configured by a system administrator, in an Pseudowire configuration process, or any other appropriate means. If the Pseudowire is designated as a primary Pseudowire, it is configured to carry network traffic (354). In the event that a primary Pseudowire fails (356), the nodes associated with the Pseudowire will attempt to switch the traffic over to the standby Pseudowire by sending a switchover request to the Pseudowire (358). As will be shown in more detail below, in some embodiments, whether the traffic on the primary Pseudowire can preempt the traffic on the standby Pseudowire and be switched over depends on priority configuration of the Pseudowires.

If it is designated as a standby Pseudowire, it is enters into standby mode to provide protection to one or more primary Pseudowires (360). In some embodiments, the standby Pseudowire carries network traffic during normal operation. It is ready to take over traffic from the primary Pseudowire if necessary. If a switchover request is received from a primary Pseudowire (362), traffic on the primary Pseudowire is switched over to the standby Pseudowire. In some embodiments, the switchover only occurs if the priority comparison of the primary and standby Pseudowires indicates the switchover is allowed.

Optionally, during the operation, if a Pseudowire is no longer needed, the source node can send a withdraw request over the Pseudowire and the destination node disassociates the Pseudowire with the LDP Hello Adjacency to break the Pseudowire connection.

Figure 4:
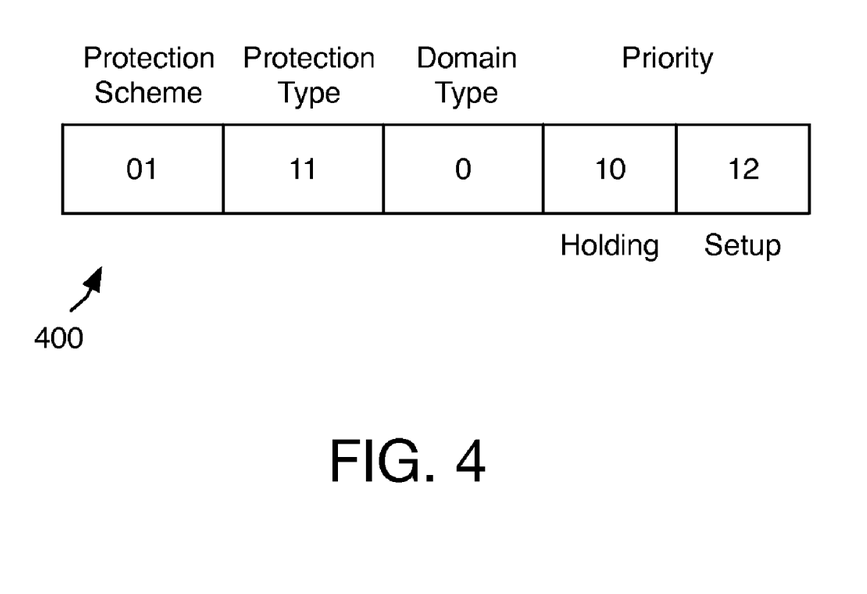
FIG. 4 is a data structure diagram illustrating an embodiment of a Pseudowire protection configuration parameter that specifies several protection-related properties of the Pseudowire.

FIG. 4 is a data structure diagram illustrating an embodiment of a Pseudowire protection configuration parameter that specifies several protection-related properties of the Pseudowire. In this example, Pseudowire protection configuration parameter 400 includes four fields: protection scheme, protection type, domain type, and priority. A field may have one or more subfields. For example, the priority field is shown to include a holding priority and a setup priority. One or more of the fields and/or subfields may be used in various embodiments. Other appropriate fields may also be implemented. In the example shown, the fields are numerical values that map to appropriate property values.

In some embodiments, one of the following Pseudowire protection schemes is used to set up the Pseudowires: 1+1, 1:1, 1:N or M:N. The protection scheme field is used to indicate which protection scheme is used in the system setup. A specific protection scheme corresponds to a field value. For example, 1+1 maps to 0, 1:1 maps to 1, and so on. In a system implementing a 1+1 protection scheme, the same traffic is sent over two parallel Pseudowires and the receiver selects one traffic stream at a time. In a system implementing a 1:1 protection scheme, one Pseudowire is used is used to protect another Pseudowire. Similarly, in a 1:N system (e.g. MPLS Facility Backup), one Pseudowire is used to protect N other Pseudowires, and in a M:N system M Pseudowires are used to protect N other Pseudowires.

The protection type field is used to configure the standby mode of the Pseudowire. In some embodiments, cold, warm, and hot standby modes are supported. Other appropriate standby modes may be implemented in other embodiments. In some embodiments, in cold standby mode configuration, once network failure on a Pseudowire carrying network traffic is detected, a standby Pseudowire is selected from the remaining functional Pseudowires, and traffic is redirected to the standby Pseudowire. In some embodiments with warm standby mode configuration, one or more standby Pseudowires are established before any network failure has occurred. These standby Pseudowires, however, are not maintained or used to transport data until a network failure is detected. Upon failure detection, the source or destination nodes will modify the data-plane and switch data traffic over to the standby Pseudowire(s). In some embodiments with hot standby mode configuration, one or more standby Pseudowires are pre-established and maintained at both control-plane and data-plane, so that once a network failure is detected, data traffic is directly switched over to the standby Pseudowire(s).

The domain type field indicates whether the Pseudowire is configured in a single-hop environment where all the nodes of the Pseudowire belong to the same carrier network, or a multi-hop environment where the Pseudowire includes nodes on several carrier networks. This is because the intermediate may process single-hop and multi-hop Pseudowire differently.

The priority field indicates the preference level of a Pseudowire in preempting other Pseudowires during switchover. In the event of a network failure, the edge nodes will preferentially provide protection according to the priority setting of the Pseudowires. In a situation where network resources (such as bandwidth) are limited, data sent on a higher priority Pseudowire is more likely to be protected than data sent on a lower priority Pseudowire. In some embodiments, the priority field includes two subfields: a holding priority and a setup priority. The holding priority indicates the relative priority of a currently active Pseudowire with respect to other Pseudowires when the latter attempt to preempt the former's use of the data link. Stated another way, it determines how easily a currently active Pseudowire gives up its hold on a data link upon request. The setup priority indicates the relative priority of a Pseudowire during the setup process.

Figure 5:
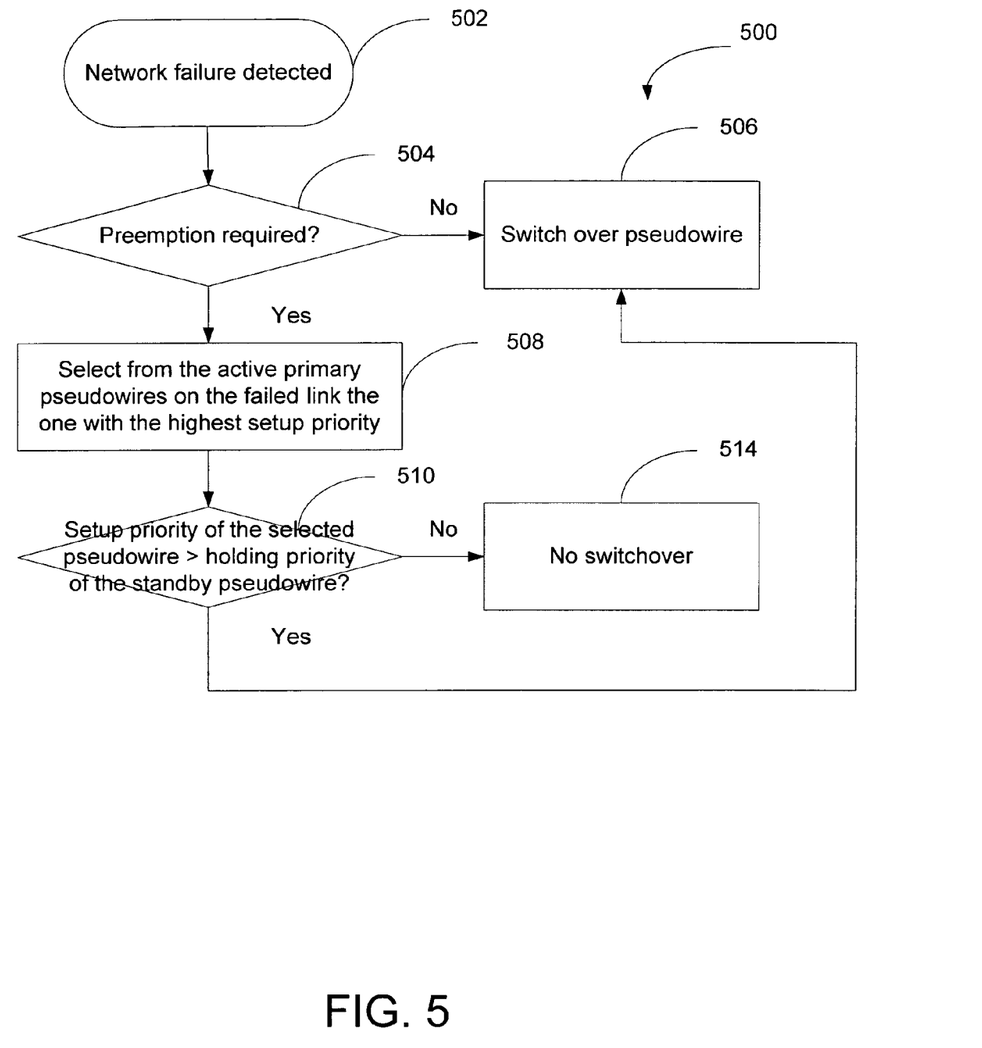
FIG. 5 is a flowchart illustrating an example process of using the priorities during switchover.

FIG. 5 is a flowchart illustrating an example process of using the priorities during switchover. Process 500 may be implemented on an edge node, an independent management agent, or the like. In this example, process 500 initiates when a network failure has been detected (502). It is determined whether preemption is required (504). Preemption is required when the failed link carries more Pseudowire traffic than the available bandwidth on the standby link. If preemption is not required, the Pseudowire(s) may directly switchover (506). If, however, preemption is required, the setup priorities of the Pseudowires on the failed link are compared and the Pseudowire with the highest setup priority is selected (508). The setup priority of the selected Pseudowire is compared to the holding priority of the standby Pseudowire (510). If the setup priority is greater than the holding priority, traffic on the selected Pseudowire is switched over to the standby Pseudowire (506). If, however, the setup priority is no greater than the holding priority, no switchover takes place and the standby Pseudowire continues to transfer its own data and the data on the failed Pseudowires is lost (514).

Figure 6:
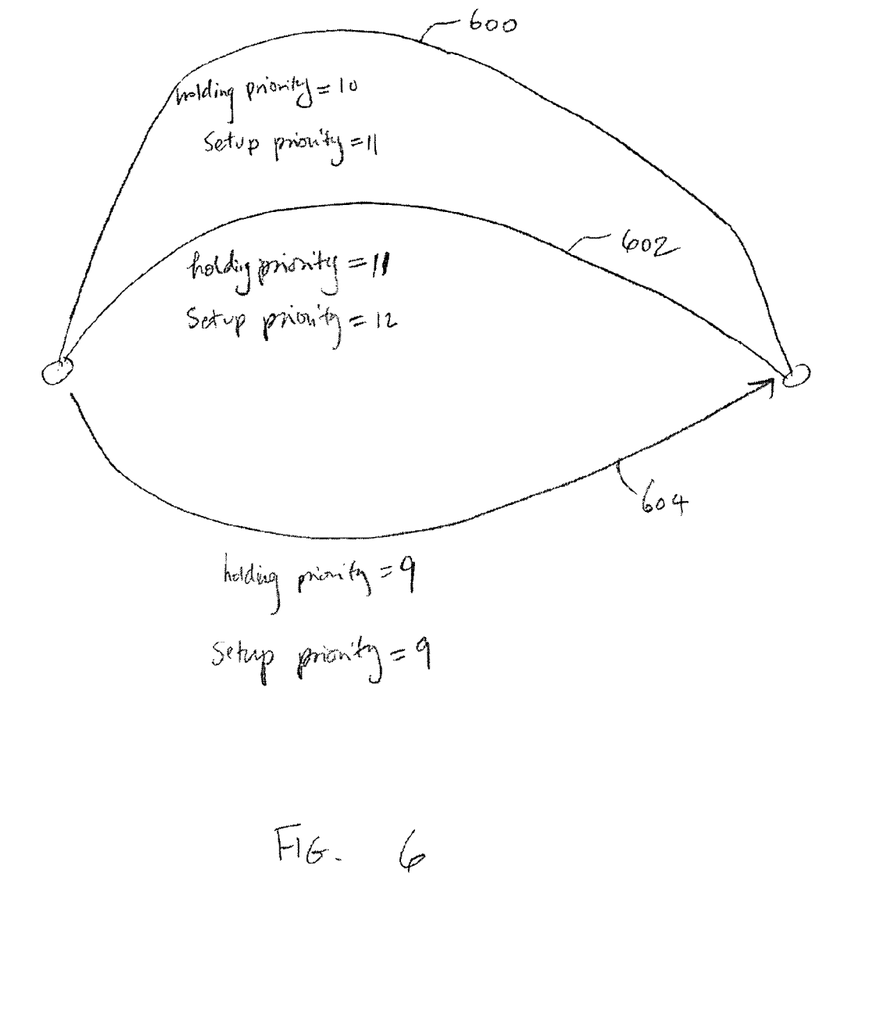
FIG. 6 is a diagram illustrating am example in which preemption takes place during a switchover operation.

FIG. 6 is a diagram illustrating am example in which preemption takes place during a switchover operation. In this example, Pseudowires 600, 602 and 604 are active, primary Pseudowires carrying traffic. Pseudowire 604 is used as the standby Pseudowire. Pseudowire 600 has a holding priority and a setup priority of 10 and 11, respectively, Pseudowire 602 has priorities of 11 and 12, and Pseudowire 604 has priorities of 9 and 9. Thus, if the link on which Pseudowires 600 and 602 operate fails, the nodes will initiate switchover using Pseudowire 604. A comparison of the setup priority of Pseudowires 600 and 602 indicates that Pseudowire 602 has a higher setup priority, thus 602 is given preference in the switchover. The setup priority of Pseudowire 602 is compared with the holding priority of Pseudowire 604. Since 602's setup priority is greater than 604's holding priority, data on 602 preempts data on 604 and takes over the link.

Providing protection to network traffic using one or more Pseudowires has been disclosed. Pseudowire protection improves the reliability of Pseudowire services. Pseudowires are better controlled by appropriately configuring the properties of Pseudowires and without requiring significant changes to existing protocols and devices.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing protection to network traffic, comprising:
    sending a Pseudowire protection configuration parameter for configuring a standby Pseudowire between a source node and a destination node, the Pseudowire protection configuration parameter indicating a protection property associated with the standby Pseudowire, the protection property including a priority for the standby Pseudowire;
    receiving a Pseudowire configuration acknowledgement indicating whether the Pseudowire protection configuration parameter has been accepted by the destination node;
    accepting the Pseudowire protection configuration parameter by the destination node;
    using the standby Pseudowire that is configured based at least in part on the Pseudowire protection configuration parameter; and
    determining whether to preempt existing traffic on the standby Pseudowire, wherein the determination is based, at least in part, on the priority for the standby Pseudowire.

2. A method as recited in claim 1, wherein the standby Pseudowire is configured to provide protection to at least one primary Pseudowire.

3. A method as recited in claim 1, wherein the standby Pseudowire is configured to provide protection to at least one primary Pseudowire, and in the event that the primary Pseudowire fails to transfer network traffic, switching network traffic from at least one of said at least one primary Pseudowire to the standby Pseudowire.

4. A method as recited in claim 1, wherein the standby Pseudowire is dynamically selected from a plurality of connections.

5. A method as recited in claim 1, wherein the protection property further includes at least one of a domain type, a protection type or a protection scheme.

6. A method as recited in claim 1, wherein the Pseudowire protection configuration parameter is established using the Label Distribution Protocol (LDP).

7. A method as recited in claim 5, wherein the domain type indicates whether the standby Pseudowire is configured in a single-hop environment where the standby Pseudowire includes a plurality of nodes coupled to a same carrier network, or a multi-hop environment where the standby Pseudowire includes a plurality of nodes coupled to several carrier networks.

8. A method as recited in claim 5, wherein the protection scheme indicates at least one of the following:
    a 1+1 protection scheme, wherein the same traffic is sent over two Pseudowires;
    a 1:1 protection scheme, wherein one standby Pseudowire is used to protect another Pseudowire;
    a 1:N protection scheme, wherein one standby Pseudowire is used to protect N other Pseudowires; or
    an M:N protection scheme, wherein M standby Pseudowires are used to protect N other Pseudowires.

9. A system for providing protection to network traffic, comprising:
    a processor configured to:
        send a Pseudowire protection configuration parameter for configuring a standby Pseudowire between a source node and a destination node, the Pseudowire protection configuration parameter indicating a protection property associated with the standby Pseudowire, the protection property including a priority for the standby Pseudowire;
        receive a Pseudowire configuration acknowledgement indicating whether the Pseudowire protection configuration parameter has been accepted by the destination node;
        accept the Pseudowire protection configuration parameter by the destination node;
        use the standby Pseudowire that is configured based at least in part on the Pseudowire protection configuration parameter; and
        determine whether to preempt existing traffic on the standby Pseudowire, wherein the determination is based, at least in part, on the priority for the standby Pseudowire.

10. A system as recited in claim 9, wherein the standby Pseudowire is configured to provide protection to at least one primary Pseudowire.

11. A system as recited in claim 9, wherein the protection property further includes at least one of a domain type, a protection type or a protection scheme.

12. A system as recited in claim 11, wherein the domain type indicates whether the standby Pseudowire is configured in a single-hop environment where the standby Pseudowire includes a plurality of nodes coupled to a same carrier network, or a multi-hop environment where the standby Pseudowire includes a plurality of nodes coupled to several carrier networks.

13. A system as recited in claim 11, wherein the protection scheme indicates at least one of the following:
   a 1+1 protection scheme, wherein the same traffic is sent over two Pseudowires;
   a 1:1 protection scheme, wherein one standby Pseudowire is used to protect another Pseudowire;
   a 1:N protection scheme, wherein one standby Pseudowire is used to protect N other Pseudowires; or
   an M:N protection scheme, wherein M standby Pseudowires are used to protect N other Pseudowires.

14. A computer program product for configuring a Pseudowire between a source node and a destination node, the computer program product being embodied in a computer readable storage medium and comprising computer instructions for:
   sending a Pseudowire protection configuration parameter for configuring a standby Pseudowire between a source node and a destination node, the Pseudowire protection configuration parameter indicating a protection property associated with the standby Pseudowire, the protection property including a priority for the standby Pseudowire;
   receiving a Pseudowire configuration acknowledgement indicating whether the Pseudowire protection configuration parameter has been accepted by the destination node;
   accept the Pseudowire protection configuration parameter by the destination node;
   using the standby Pseudowire that is configured based at least in part on the Pseudowire protection configuration parameter; and
   determining whether to preempt existing traffic on the standby Pseudowire, wherein the determination is based, at least in part, on the priority for the standby Pseudowire.

15. A computer program product as recited in claim 14, wherein the protection property further includes at least one of a domain type, a protection type or a protection scheme.

16. A computer product as recited in claim 15, wherein the domain type indicates whether the standby Pseudowire is configured in a single-hop environment where the standby Pseudowire includes a plurality of nodes coupled to a same carrier network, or a multi-hop environment where the standby Pseudowire includes a plurality of nodes coupled to several carrier networks.

17. A computer product as recited in claim 15, wherein the protection scheme indicates at least one of the following:
   a 1+1 protection scheme, wherein the same traffic is sent over two Pseudowires;
   a 1:1 protection scheme, wherein one standby Pseudowire is used to protect another Pseudowire;
   a 1:N protection scheme, wherein one standby Pseudowire is used to protect N other Pseudowires; or
   an M:N protection scheme, wherein M standby Pseudowires are used to protect N other Pseudowires.

* * * * *